(12) United States Patent
Quick

(10) Patent No.: US 6,948,714 B1
(45) Date of Patent: Sep. 27, 2005

(54) GASKET AND METHOD FOR PRODUCING A GASKET

(75) Inventor: Lothar Quick, Nersingen (DE)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/019,472

(22) PCT Filed: Jun. 15, 2000

(86) PCT No.: PCT/DE00/01972

§ 371 (c)(1), (2), (4) Date: Mar. 4, 2002

(87) PCT Pub. No.: WO00/79156

PCT Pub. Date: Dec. 28, 2000

(30) Foreign Application Priority Data

Jun. 22, 1999 (DE) ................. 199 28 580

(51) Int. Cl.[7] ............................................. F02F 11/00
(52) U.S. Cl. ..................... 277/592; 277/593; 277/596
(58) Field of Search ................................ 277/590–596

(56) References Cited

U.S. PATENT DOCUMENTS

| | | | |
|---|---|---|---|
| 4,180,211 A | | 12/1979 | Olcott et al. |
| 4,203,608 A | * | 5/1980 | Nicholson ............. 277/595 |
| 4,290,616 A | * | 9/1981 | Nicholson ............. 277/592 |
| 4,721,315 A | * | 1/1988 | Ueta ..................... 277/593 |
| 5,582,415 A | | 12/1996 | Yochida et al. |
| 5,688,860 A | | 11/1997 | Croft |
| 5,702,111 A | | 12/1997 | Smith |
| 6,062,572 A | * | 5/2000 | Hasegawa et al. ...... 277/592 |
| 6,105,971 A | * | 8/2000 | Hasegawa .............. 277/593 |
| 6,113,110 A | * | 9/2000 | Hasegawa .............. 277/593 |
| 6,180,167 B1 | * | 1/2001 | Majewski et al. ....... 427/198 |
| 6,211,458 B1 | * | 4/2001 | Mitchell et al. ........ 174/35 R |
| 2001/0048202 A1 | * | 12/2001 | Zerfab et al. .......... 277/592 |

FOREIGN PATENT DOCUMENTS

| | | |
|---|---|---|
| DE | 3543839 A1 | 12/1985 |
| DE | 3611285 A1 | 4/1986 |
| DE | 195 28 031 A1 | 2/1997 |
| DE | 197 11 562 A1 | 9/1998 |
| EP | 0 757 195 B1 | 2/1997 |
| EP | 0797029 A1 | 3/1997 |
| EP | 0853204 A1 | 1/1998 |
| EP | 0982517 A1 | 8/1998 |

(Continued)

OTHER PUBLICATIONS

Derwent English abstracts of EP 0797029A1, DE 3611285A1 and DE 3543839A1.

Delphion English Abstract for US6207300 (which is the English equivilent of DE 197 11 562 A1) (5 pages).

(Continued)

*Primary Examiner*—Alison Pickard
*Assistant Examiner*—Vishal Patel
(74) *Attorney, Agent, or Firm*—Rader, Fishman & Grauer PLLC

(57) ABSTRACT

The invention relates to a gasket having at least one metallic layer, in which at least one gasket opening and at least one bead are formed, and in and/or adjacent to the bead a coating is applied as a deformation limiter, which comprises at least one filler and one bonding agent, the mass proportion of the filler being greater than the bonding agent and the filler being present in particle form, and the individual spherical particles having a small surface in relation to the volume of the particle.

20 Claims, 1 Drawing Sheet

FOREIGN PATENT DOCUMENTS

Figure 1:
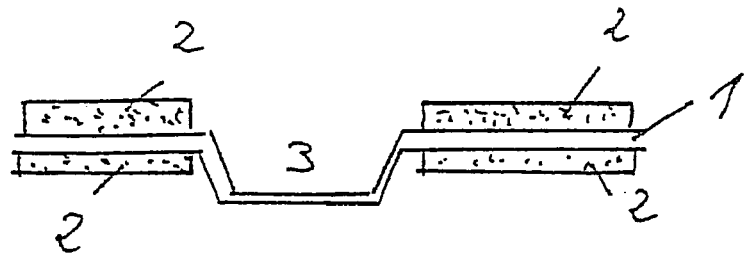

| | | | |
|---|---|---|---|
| JP | 09229196 A | | 9/1997 |
| JP | 409287663 A | * | 11/1997 |
| JP | 10036764 A | * | 2/1998 |
| JP | 2000145968 A | * | 5/2000 |

OTHER PUBLICATIONS

Delphion English Abstract for EP 0 757 195 B1 (which is also an equivilent of DE 195 28 031 A1) (3 pages).

* cited by examiner

GASKET AND METHOD FOR PRODUCING A GASKET

The invention relates to a gasket having at least one metallic layer, in which at least one gasket opening and at least one bead are formed, and in and/or adjacent to such a bead a coating is applied as a deformation limiter (stopper), the coating comprising at least one filler and one bonding agent, as well as to a method of producing such a gasket. Such a gasket can be used by preference as a cylinder head gasket for internal combustion engines.

In gaskets which are formed from one or even more metallic layers disposed the one above the other, it is usual to form beads by deformation, in order to improve the sealing effect, especially in the critical regions in which apertures are arranged for the cylinder bores but also other apertures through which bolts, lubricant or coolant are led. In order to prevent too strong a compression or displacement of such beads as a result of the clamping forces acting during assembly, it is usual to form or arrange at or on individual metallic layers of such a gasket deformation limiters, also called spring limiters or stoppers.

To form such a deformation limiter, besides the bending over of a metallic layer in a region in the proximity of such a bead, in EP 0 797 029 A1 reference is made to another possible way of forming such a deformation limiter. There it is proposed that the deformation limiter be configured in the form of a raised portion, and for this purpose a sufficiently temperature-stable thermosetting material is used as the transport medium and bonding agent with the addition of at least one mineral filler, with a low thermal expansion coefficient. These components are intended to form a heavy-duty and resilient framework, with which it is possible to counteract any undesired excessive deformation in the bead region. It is proposed here that the bonding agent and such a filler (quartz powder, rutile, dolomite or wollastonite) should be used in equal proportions, more favourably however in the ratio 1:3 filler to bonding agent.

This means that the bonding agent has to be so selected that it not only withstands increased temperatures but also has sufficient strength to be able to withstand the pressures and compressive forces and the oscillations which occur for example in internal combustion engines, since the proportion of filler is correspondingly limited. This aspect becomes more and more important since modern combustion engines are operated at higher combustion pressures and correspondingly also higher temperatures and with higher demands of a gasket.

Since organic binders, as also the mineral fillers, have relatively poor heat conductivity, the deformation limiters so produced hinder heat transfer and this can lead to undesired temperature gradients on such a gasket.

This disadvantage can, however, also not be easily overcome by using metal powders as the filler, as is proposed in U.S. Pat. No. 5,582,415, if the known bonding agent:filler proportions are maintained. Such a metal powder as the filler is moistened during a corresponding application all over by the organic bonding agent, the fissured surface structuring of such metal powders also having a disadvantageous effect and the largest number of the individual metal powder particles being thermally insulated from one another by the organic bonding agent.

The object of the invention, therefore, is to provide a gasket having at least one metallic layer, in which at least one gasket opening and at least one bead are formed, with deformation limiters, the strength of which is increased and the temperature properties of which are improved.

According to the invention, this object is achieved with the features of a gasket and the method of producing such a gasket. Advantageous embodiments and developments of the invention arise with the features mentioned in the subordinate claims.

In the invention, deformation limiters are also formed by the application of a coating which contains at least one filler and one bonding agent. However here an increased proportion of filler is used, the mass proportion of which is greater than the proportion of bonding agent. Furthermore a filler in particle form is used, the individual particles of which have a small surface in relation to the volume of the particle, such that in the finished coating tight packing of the individual particles of the filler can be achieved and a relatively large number of these particles adjoin one another directly, such that they support one another directly and the bonding agent used must substantially ensure the connecting function for the filler and the applied coating, whereas the pressures and compressive forces are substantially borne by the filler in particle form.

The spherical filler particles used should, in contrast to conventional powder-form materials, have a smoothed surface, the edges of which at least are rounded. It is certainly most propitious to use spherical particles since they are known to be able to achieve the smallest surface:volume ratio. When such a filler is used, good processability is provided, especially during application.

As already mentioned, the proportion of filler should be greater than the proportion of bonding agent, improved properties being easily achieved from ratios of 2:1, i.e. ⅓ bonding agent and ⅔ filler, upwards. The proportion of filler should advantageously be further increased and filling amounts of above 90% by mass of such a filler can be achieved, the desired properties being able to be further improved with the increased proportion of filler.

The individual particles of the filler used should have average grain sizes in the range between 5 and 100 $\mu$m, it being necessary for at least 80% of the particles to be in this grain size range.

To improve the properties of the finished coating, it can moreover be propitious to use particles of differing grain size so that tighter packing of the individual particles and correspondingly higher degrees of filling can be achieved, since smaller particles can fill the spaces between larger particles.

As filler materials, metals, metal alloys, glass but also ceramics and mixtures thereof can be used, silicon nitride or silicon carbide being advantageously used as ceramics taking into account their heat conductivity.

A suitable filler is a copper/tin alloy.

As a suitable bonding agent can be used a thermosetting material, for example an epoxy resin, a silicon resin or a polyamide resin, especially an epoxy resin based on bisphenol A; on account of the lowered strength requirements, a bonding agent can also be selected which can be optimised in the direction of temperature resistance and increased bonding agent function.

In the initial material for the coating to be applied, at least one thermoplastic addition can also be contained which, for example, improves the processability of a prepared mixture. Such an addition can be for example a PTFE, polyethylene, polypropylene or a polyamide.

For the processability, especially during the application of the coating, it is propitious to use a bonding agent which already has plastic deformability at room temperature. For this purpose some of the possible thermosetting materials already mentioned are very suitable. Another criterion for the selection of such a plastics material is the glass-transition temperature. It should advantageously be above 150° C. in order to make allowance for the temperature conditions occurring at an internal combustion engine.

Since the brittleness of the initial materials selected for the coating is low, these can be easily applied even before the stamping process for forming the beads.

The coating forming the deformation limiter can be applied as lines in the form of a closed line but also in the form of an interrupted line. The lines can be varied in width, height and/or shape, according to requirement. The coating can be arranged adjacent to a bead, but also directly in a bead or respectively in a multi-layer gasket on a layer in the region of a bead which is formed in the adjacent layer.

If the coating is arranged in the bead, this bead can be crimped again on the outside, so that a bulge extends into the bead.

The coating, as the deformation limiter can however also be applied on opposite sides of a layer of a gasket, or respectively a bead, in order to ensure the deformation-limiting effect.

Especially when the coating has been applied in a bead, it can be advantageous so to configure the coating that the surface of the coating pointing to the outside comprises substantially bonding agent and/or a thermoplastic addition so that such a surface is configured more even and ensures more favourable sliding properties. For this purpose, however, a thin sealing layer can also be formed in addition.

During the production of a gasket according to the invention, the deformation limiter or limiters can be formed by the application of a mixture, containing the components mentioned already, to a metallic layer, this being followed generally by a hardening process in which the hardening is carried out by means of an energy input, e.g. during heat treatment.

The prepared mixture can be applied for example by means of a printing method, such as matrix printing or screen printing, the width and thickness of the coating during screen printing being able to be especially easily set by corresponding configuration and dimensioning of the screen used.

Figure 2:
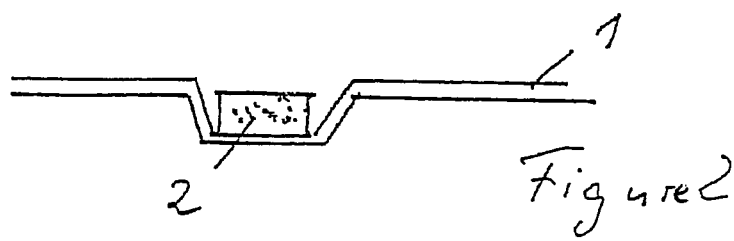
Figure 3:
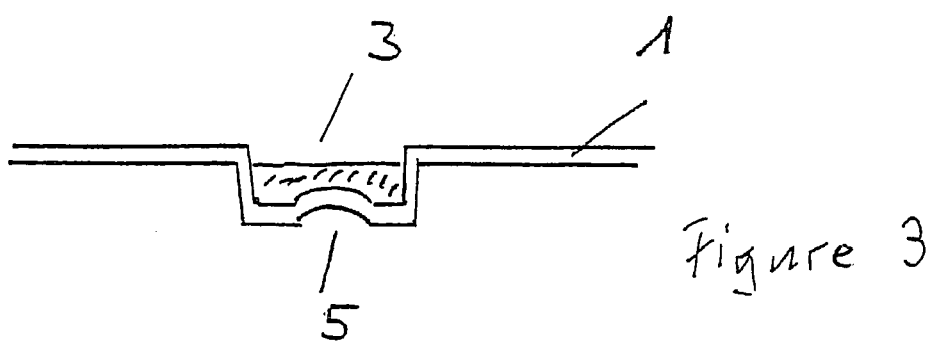

The invention is described below by way of example. The figures show:

FIG. 1 a portion of a metallic layer of a gasket with deformation limiters formed on both sides of a bead;

FIG. 2 a deformation limiter formed inside a bead;

FIG. 3 a deformation limiter formed in a bead, with counter-bead and

Figure 4:
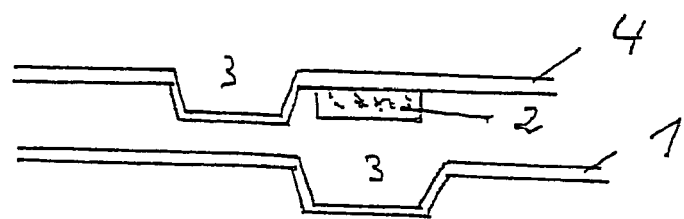

FIG. 4 a deformation limiter formed on a flat portion of a metallic layer, which limiter engages in the assembled state in a bead which is formed in an adjacent layer.

In FIG. 1 is represented a plurality of different possible arrangements for spring limiters which are applied in the form of a coating 2 to a metallic layer 1. Thus it can be recognised that on both sides of a bead 3, lying opposite one another, a coating 2 can be disposed as a deformation limiter. On their own or in addition, coatings 2 can be applied to the other side of the metallic layer 1. The coatings 2 as deformation limiters can extend until almost directly up to a gasket opening.

The thickness of such a coating 2 can be in the range between 20 and 300 μm.

If a coating 2 is applied inside a bead 3 on a metallic layer 1, as is illustrated in FIG. 2, the coating can have a thickness in the range between 30 and 250 μm, it being possible for the thickness of the coating 2 to be smaller than the actual depth of the bead 3.

In the example shown in FIG. 3, again a coating 2 is applied inside a bead 3, it being possible to recognise in this example that an additional bead 5 is present on the outer side, such that a bulge extends in the direction of the interior of the bead 3. This has proved to be advantageous since in this way a better sealing effect is produced.

In the example represented in FIG. 4, two metallic layers 1 and 4 of a gasket are illustrated, there being applied to metallic layer 4 a coating 2 which, in the assembled state of such a multi-layer gasket, can engage in a bead 3 which is formed in the adjacent layer 1. The coating 2 can be of such dimensions that it fills the bead 3 in layer 1 completely, but also only partially. Instead of bead 3, a corresponding depression in layer 1 can be formed which is otherwise not deformed in the shape of a bead.

What is claimed is:

1. A gasket comprising:
    at least one metallic layer including at least one gasket opening and at least one bead; and
    a deformation limiter including at least one filler and one bonding agent, where said filler and said bonding agent form a coating,
    wherein a mass proportion of the filler is greater than a proportion of bonding agent,
    wherein at least 80% of the particles of filler have an average grain size in the range between 5 and 100 μm,
    wherein a mass ratio of filler to bonding agent is at least 2:1, and
    wherein each particle of filler has a small surface area in relation to a volume of the particle.

2. A method of manufacturing a gasket comprising at least one metallic layer, in which at least one gasket opening and at least one bead are formed, and in or adjacent to the bead a coating is applied as a deformation limiter, the method comprising:
    applying a mixture containing at least one filler and one bonding agent to a metallic layer, wherein a mass proportion of filler being greater than a proportion of bonding agent, wherein a mass ratio of filler to bonding agent is at least 2:1, wherein a filler in particle form is used, wherein each particle has a small surface area in relation to the volume of the particle, wherein at least 80% of the particles of filler have an average grain size in the range between 5 and 100 μm; and
    hardening the applied coating.

3. The gasket of claim 1, wherein the particles have a smoothed, rounded surface.

4. The gasket of claim 1, wherein the particles are spherical.

5. The gasket of claim 1, wherein the particles are selected from the group consisting of a metal, an alloy, a resin, a ceramic and mixtures thereof.

6. The gasket of claim 5, wherein the particles include a copper and tin alloy.

7. The gasket of claim 1, wherein in the mass ratio of filler to bonding agent is at least 9:1.

8. The gasket of claim 1, wherein the bonding agent is a thermosetting material.

9. The gasket of claim 1, further comprising at least one thermoplastic addition.

10. The gasket of claim 1, wherein the coating is applied in the form of a line of uneven width or height or shape.

11. The gasket of claim 1, wherein the coating is applied to two facing side of a metallic layer.

12. The gasket of claim 1, wherein the coating is applied on a first metallic layer near the bead of a second metallic layer.

13. The gasket of claim 1, wherein the coating is arranged in a bead.

14. The method of claim 2, wherein the hardening step includes inputting energy.

15. The method of claim 2, wherein the applying step includes applying a mixture with a mass ratio of filler to bonding agent is at least 2:1.

16. The method of claim 2, wherein the applying step includes printing the mixture on to the metallic layer.

17. The method of claim 2, wherein the hardening step includes heating.

18. A gasket comprising:
a metallic layer; and
a coating including a particulate filler and a bonding agent wherein the particulate filler to bonding agent mass ratio is at least 2:1, wherein at least 80% of the particles of filler have an average grain size in the range between 5 and 100 $\mu$m; and
wherein the particulate filler has a small surface area compared to the volume of the particulate filler.

19. A gasket comprising:
at least one metallic layer including at least one gasket opening and at least one bead; and
a deformation limiter including at least one filler and one bonding agent,
wherein said filler and said bonding agent form a coating, wherein a mass proportion of said filler is greater than a proportion of bonding agent, wherein a mass ratio of filler to bonding agent is at least 2:1, wherein each particle of filler has a small surface area in relation to a volume of the particle, wherein the particles are spherical, and wherein at least 80% of the particles have an average grain size in the range between 5 and 100 $\mu$m, and wherein said coating has a glass transition temperature of greater than about 302° F. (150° C.).

20. The gasket of claim 1, wherein in the mass ratio of filler to bonding agent is greater than 9:1.

* * * * *